US012587052B2

(12) United States Patent
Ohta et al.

(10) Patent No.: US 12,587,052 B2
(45) Date of Patent: Mar. 24, 2026

(54) ELECTRIC MOTOR

(71) Applicant: TOYOTA JIDOSHA KABUSHIKI KAISHA, Toyota (JP)

(72) Inventors: Kei Ohta, Toyota (JP); Hideaki Miyazono, Kasugai (JP); Junya Kobayashi, Ama (JP); Junichi Deguchi, Toyota (JP); Hironori Asaoka, Okazaki (JP); Sho Okazaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 173 days.

(21) Appl. No.: 18/507,673

(22) Filed: Nov. 13, 2023

(65) Prior Publication Data

US 2024/0162773 A1 May 16, 2024

(30) Foreign Application Priority Data

Nov. 14, 2022 (JP) ................................. 2022-182028

(51) Int. Cl.
H02K 1/32 (2006.01)
H02K 9/19 (2006.01)
(52) U.S. Cl.
CPC ................. H02K 1/32 (2013.01); H02K 9/19 (2013.01)
(58) Field of Classification Search
CPC .................................... H02K 1/32; H02K 9/19
See application file for complete search history.

(56) References Cited

U.S. PATENT DOCUMENTS

| | | | |
|---|---|---|---|
| 2014/0125165 A1 | 5/2014 | Miyamoto et al. | |
| 2016/0344247 A1* | 11/2016 | Jeong ........................ | H02K 9/19 |
| 2018/0069455 A1 | 3/2018 | Engblom | |
| 2018/0205294 A1* | 7/2018 | Manabe ............... | H02K 5/1732 |

FOREIGN PATENT DOCUMENTS

| | | |
|---|---|---|
| JP | 2009-118686 A | 5/2009 |
| JP | 2013-9508 A | 1/2013 |
| JP | 2013-183481 A | 9/2013 |
| JP | 2019-518408 A | 6/2019 |
| WO | 2017/214232 A1 | 12/2017 |

* cited by examiner

*Primary Examiner* — Viet P Nguyen
(74) *Attorney, Agent, or Firm* — Sughrue Mion, PLLC

(57) ABSTRACT

An electric motor disclosed herein may comprise a rotor core fixed to a shaft, a stator, and first and second refrigerant passages. The stator may include coil ends at both ends. The first refrigerant passage may be provided in the shaft and arranged outside the rotor core in an axial direction of the shaft. The second refrigerant passage may extend inside the rotor core. A first outlet of the first refrigerant passage may be provided on the shaft, and an ejecting direction of refrigerant at the first outlet may be directed towards one of the coil ends. The rotor core is cooled by the refrigerant flowing in the second refrigerant passage. The coil ends are cooled by the refrigerant flowing in the first refrigerant passage, that is, the refrigerant that has not cooled the rotor.

2 Claims, 6 Drawing Sheets

ELECTRIC MOTOR

REFERENCE TO RELATED APPLICATIONS

This application claims priority from Japanese Patent Application No. 2022-182028 filed on Nov. 14, 2022. The entire contents of the priority application are incorporated herein by reference.

BACKGROUND ART

The technique disclosed herein related to an electric motor.

An electric motor includes a stator and a rotor that rotates inside the stator. For simplicity of explanation, "electric motor" will hereafter be simply referred to as "motor". The motor (electric motor) also includes a cooling structure to cool the stator and the rotor. A coil end is arranged at each end of the stator. The coil ends tend to become hot. It is desirable that the cooling structure of the motor can cool the coil ends effectively.

Japanese Patent Application Publication No. 2013-009508 describes a motor that supplies refrigerant into a shaft of a rotor. Refrigerant outlets are provided in a side surface of the shaft. The refrigerant outlets are directed to the coil ends of the stator. The refrigerant ejected from the refrigerant outlets hits the coil ends and cools the coil ends.

DESCRIPTION

The coil ends tend to become hot and a rotor core also becomes hot. The present disclosure provides a motor that can efficiently cool both a rotor core and coil ends.

A motor disclosed herein may comprise a shaft, a rotor core, a stator, and first and second refrigerant passages. The shaft may be rotatably supported by a housing. The rotor core may be fixed to the shaft. The stator may be arranged outside the rotor core in a radial direction of the rotor core, and the stator may include coil ends at both ends. The first refrigerant passage may be provided in the shaft. The first refrigerant passage may be arranged outside the rotor core in an axial direction of the shaft. The first refrigerant passage may not extend inside the rotor core. The second refrigerant passage may extend inside the rotor core. In other words, the second refrigerant passage may pass through the rotor core. An outlet of the first refrigerant passage may be provided on the shaft. An ejecting direction of the refrigerant at the outlet of the first refrigerant passage may be directed towards one of the coil ends. For convenience of explanation, the outlet for the refrigerant in the first refrigerant passage is referred to as a "first outlet".

In the motor disclosed herein, the coil ends are cooled by the refrigerant ejected from the first outlet. The first refrigerant passage does not extend inside the rotor core, thus the refrigerant in the first refrigerant passage is not heated by the rotor core. The rotor core is cooled by the refrigerant flowing in the second refrigerant passage. In the motor disclosed herein, each of the rotor core and the coil ends is cooled by the cold refrigerant. This motor can cool both the rotor core and the coil ends efficiently.

Details of the technique disclosed herein and further developments will be described in "DETAILED DESCRIPTION".

DETAILED DESCRIPTION

Figure 1:
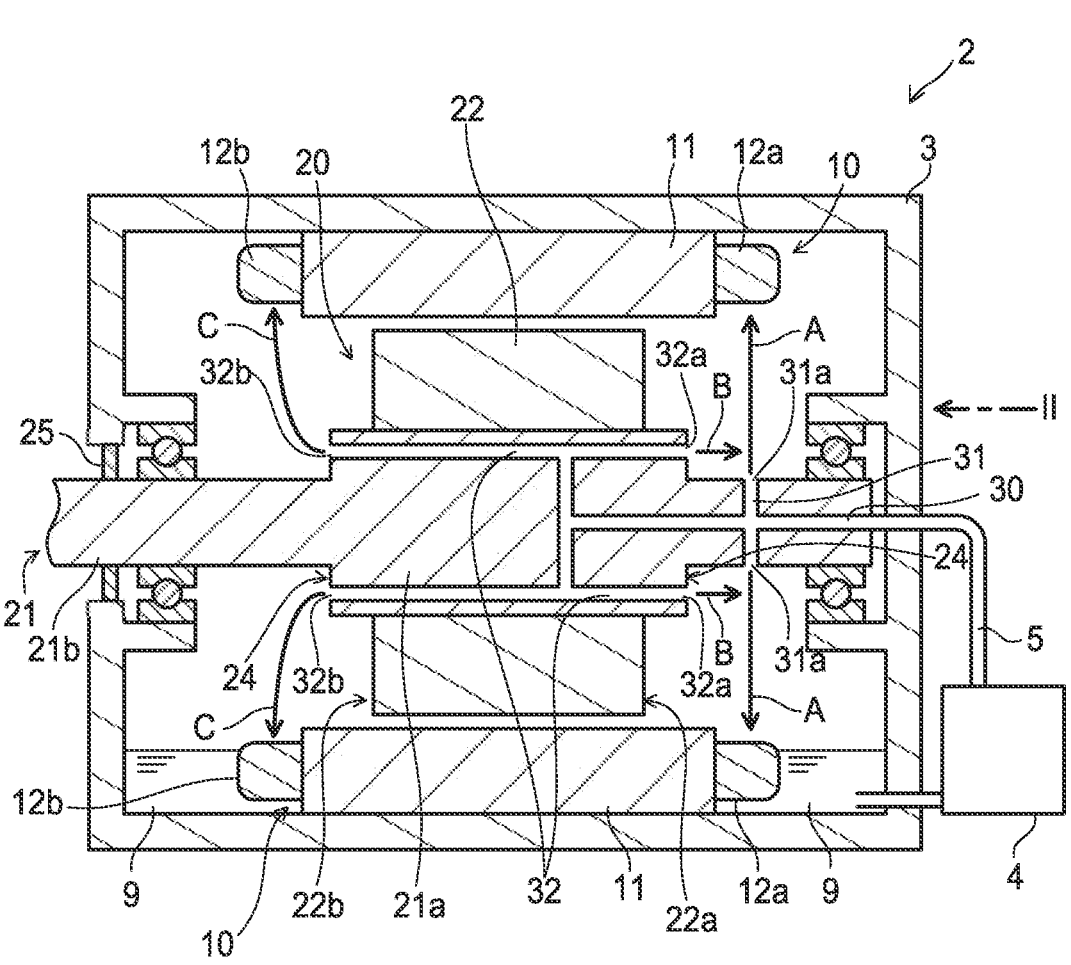
FIG. 1 illustrates a cross-sectional view of a motor of a first embodiment.
Figure 1:
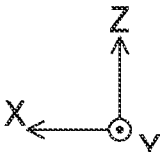

Prior to an explanation of embodiments, features of the technique disclosed herein are listed below.

A motor may comprise a shaft, a rotor core, a stator, and first and second refrigerant passages. The first refrigerant passage may be arranged outside the rotor core in an axial direction of the shaft. The second refrigerant passage may extend inside the rotor core. An outlet of the second refrigerant passage may be provided on at least one end surface of the rotor core. For convenience of explanation, the outlet of the second refrigerant passage is referred to as a "second outlet". An ejecting direction of the refrigerant ejected from the second outlet may cross the ejecting direction of the refrigerant ejected from the first outlet. The refrigerant ejected from the second outlet collides with the refrigerant ejected from the first outlet and splashes toward the coil ends. The coil ends are cooled not only by the refrigerant ejected from the first refrigerant passage but also by the refrigerant ejected from the second refrigerant passage. The second refrigerant passage may be provided outside the shaft in the radial direction of the shaft.

The second outlet may be provided on the shaft. The ejecting direction of the refrigerant ejected from the second outlet may cross the ejecting direction of the refrigerant ejected from the first outlet. The second refrigerant passage may be provided inside the shaft.

The second outlet of the second refrigerant passage may be provided on at least one the end surface of the rotor core or the shaft. In this case, a protrusion may be provided on a side surface of the shaft and the first outlet may be provided at a top of the protrusion. Furthermore, in this case, the second outlet may be arranged so that the ejecting direction of the refrigerant ejected from the second outlet crosses the protrusion. The refrigerant ejected from the second outlet collides with the protrusion which rotates with the shaft, and splashes toward the coil ends. The coil ends are cooled not only by the refrigerant ejected from the first outlet but also by the refrigerant ejected from the second outlet.

A disk plate may be coaxially attached to the shaft and the first outlet may be provided on a side surface of the disk plate. When the disk plate is attached to the shaft instead of the protrusion, the shaft rotates more stably. Further, since the first outlet is closer to the coil ends, the refrigerant is focused on and hits the coil ends.

The ejecting direction of the refrigerant ejected from the second outlet may be arranged so that it crosses the disk plate. The refrigerant ejected from the second outlet hits the rotating disk plate and splashes toward the coil ends. The coil ends are cooled not only by the refrigerant ejected from the first outlet but also by the refrigerant ejected from the second outlet.

The rotor core may include a first end surface and a second end surface opposite to the first end surface. The first outlet may be provided on a first end surface side, and the second outlet may be provided on a second end surface side. The coil ends on both ends of the stator can be cooled.

First Embodiment

With reference to the drawings, a motor 2 of a first embodiment will be described. FIG. 1 illustrates a cross-sectional view of the motor 2. The motor 2 includes a stator 10 and a rotor 20. The rotor 20 includes a shaft 21 and a rotor core 22. For convenience of explanation, an axial direction of the shaft 21 will be referred to as a shaft axial direction. An X-direction in the coordinate system of FIG. 1 corresponds to the shaft axial direction.

Figure 2:
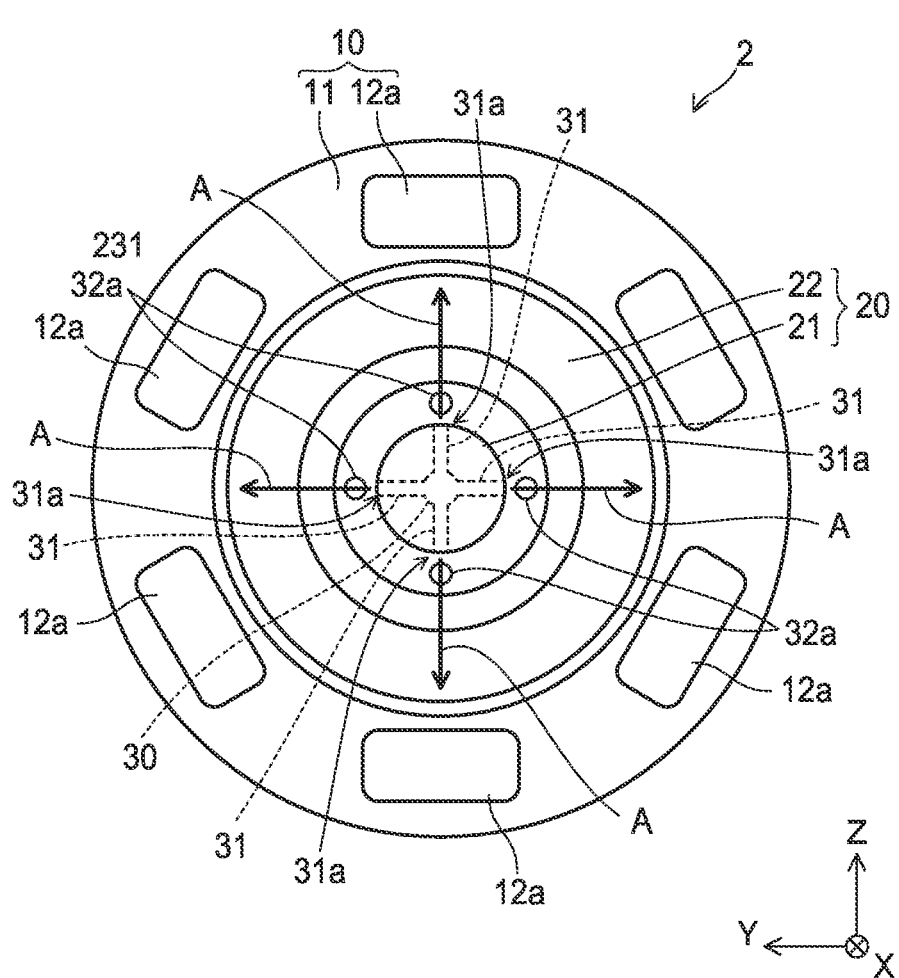
FIG. 2 illustrates the motor of FIG. 1 viewed along a one-dot chain arrow II.

The stator 10 is fixed inside a motor housing (housing 3). The stator 10 includes a stator core 11 and coil ends 12a, 12b. The stator core 11 is obtained by stacking a plurality of electromagnetic steel plates. The stator core 11 may be obtained by pressurizing and solidifying magnetic iron powder. Wires (not illustrated) are wrapped around the stator core 11. The wires constitute coils. The coil ends 12a, 12b refer to ends of the coils in a shaft axial direction when the coils are wrapped around teeth of the stator core 11. In other words, the coil ends 12a, 12b refer to portions of the coils protruding in the shaft axial direction from end surfaces of the stator core 11. In the drawings, the stator core 11 is simplified, and the detailed illustration of the structure of the stator 10 (e.g., shapes of teeth) is omitted. The stator 10 is a cylinder extending in the shaft axial direction. The coil ends 12a, 12b are positioned at both ends of the stator 10 in the shaft axial direction. As illustrated in FIG. 2, the coil end 12a includes a plurality of coil ends, and the plurality of coil ends 12a is arranged along the circumferential direction of the stator 10 and equally spaced from each other.

The shaft 21 of the rotor 20 is rotatably supported within the housing 3 via bearings. One end of the shaft 21 extends out of the housing 3. A space between an opening of the housing 3 and the shaft 21 is sealed by a mechanical seal 25.

The rotor core 22 is fixed to the shaft 21. Both ends of the rotor core 22 are fixed to the shaft 21 by endplates (not illustrated). The rotor core 22 is positioned inside the cylindrical stator 10. In other words, the stator 10 surrounds the rotor core 22. In yet other words, the stator 10 is arranged outside the rotor core 22 in the radial direction of the rotor core 22. The rotor core 22 is positioned between the coil ends 12a, 12b which are at the respective ends of the stator 10 in the shaft axial direction.

Refrigerant 9 collects at the bottom of the housing 3, and the pump 4 pumps the refrigerant 9 from the bottom and supplies the refrigerant into the shaft 21. The refrigerant 9 is oil, and also functions as lubricant for smoothly rotating the rotor 20. In FIG. 1, the pump 4 is arranged outside the housing 3, however, the pump 4 may be arranged inside the housing 3.

A refrigerant passage 5 extends from the pump 4 to the distal end of the shaft 21. A common refrigerant passage 30 is defined from the distal end into the shaft 21. Although not illustrated, the distal end of the refrigerant passage 5 and the inlet of the common refrigerant passage 30 are coupled by a rotary fluidic joint. The common refrigerant passage 30 branches into first refrigerant passages 31 and second refrigerant passages 32 inside the shaft 21. The second refrigerant passages 32 extend into the rotor core 22. In other words, the second refrigerant passages 32 pass through the rotor core 22. The first refrigerant passages 31 do not extend to the inside of the rotor core 22, and are located outside the rotor core 22 in the shaft axial direction. In other words, the first refrigerant passages 31 do not extend inside the rotor core 22. The refrigerant supplied by the pump 4 flows in the first refrigerant passages 31 and in the second refrigerant passages 32.

FIG. 2 illustrates the motor 2 viewed along a direction of a one-dot-chain arrow II in FIG. 1. In FIG. 2, only the stator 10 and the rotor 20 are illustrated and illustration of the other parts is omitted. The shaft 21 includes a plurality of first refrigerant passages 31, and each of the first refrigerant passages 31 extends in the radial direction of the shaft 21. In other words, the plurality of first refrigerant passages 31 extends in radially from the center of the shaft 21. Each of the first refrigerant passages 31 is open on the side surface of the shaft 21. Openings of the first refrigerant passages 31 are referred to as first outlets 31a. The first outlets 31a are open toward the coil ends 12a.

The refrigerant which passed through the first refrigerant passages 31 is ejected from the first outlets 31a toward the coil ends 12a. The thick arrow lines A in FIGS. 1, 2 represent directions along which the refrigerant is ejected from the first outlets 31a. The ejecting directions at the first outlets 31a are directed to the coil ends 12a. In other words, the ejecting directions at the first outlets 31a extend toward the coil ends 12a.

As illustrated in FIG. 2, the plurality of coil ends 12a is arranged to surround the rotor 20. As the rotor 20 rotates, the plurality of first outlets 31a also rotates, and the refrigerant is ejected onto all of the plurality of coil ends 12a. The coil ends 12a are cooled by the refrigerant ejected thereto.

The second refrigerant passages 32 extend inside the rotor core 22. The rotor core 22 is cooled by the refrigerant flowing through the second refrigerant passages 32. On the other hand, the first refrigerant passages 31 do not extend inside the rotor core 22. The refrigerant that has passed through the first refrigerant passages 31 is ejected from the first outlets 31a toward the coil ends 12a. The coil ends 12a are cooled by the cold refrigerant that has not passed through the rotor core 22. In the motor 2 of the embodiment, both the rotor core 22 and the coil ends 12a are cooled by the cold refrigerant. The motor 2 can cool both the rotor core 22 and the coil ends 12a efficiently. The coil ends 12b on the other end is cooled by the refrigerant that has passed through the inside of the rotor core 22, as explained next.

The second refrigerant passages 32 extend into the inside of the rotor core 22. The second refrigerant passages 32 extend inside the rotor core 22 and the inside of the shaft 21. In the shaft axial direction, the center portion of shaft 21 has a larger diameter than the ends. The central portion having the large diameter is referred to as a large diameter portion 21a. Portions extending from the ends of the large diameter portion 21a and having a smaller diameter are referred to as small diameter portions 21b. The rotor core 22 is fixed to the large diameter portion 21a. There are steps at the boundaries between the large diameter portion 21a and the small diameter portions 21b, and end surfaces 24 of the large diameter portion 21a are partially exposed. The second refrigerant passages 32 are open at the end surfaces 24 on both sides of the large diameter portion 21a. The openings of the second refrigerant passages 32 are referred to as second outlets 32a, 32b. One of end surfaces of the rotor core 22 that is closer to the first refrigerant passages 31 is referred to as a proximal end surface 22a of the rotor core 22, and the end surface that is farther from the first refrigerant passages 31 is referred to as a distal end surface 22b. The second outlets 32a are located on the proximal end surface 22a side. In other words, the second outlets 32a are located closer to the first outlets 31a in the shaft axial direction. The second outlets 32b are located on the distal end surface 22*b* side. In other words, the second outlets 32*b* are located on the opposite side of the first outlets 31*a* across the rotor core 22.

The refrigerant is also ejected from the second outlets 32*a* provided on the proximal end surface 22*a* side. The thick arrow lines B in FIG. 1 show the ejecting direction of the refrigerant ejected from the second outlets 32*a*. The ejecting direction of the refrigerant ejected from the second outlets 32*a* is parallel to the shaft axial direction. The ejecting direction of the refrigerant ejected from the second outlets 32*a* crosses the ejecting directions of the refrigerant ejected from the first outlets 31*a*. FIG. 2 does not show the ejecting direction at the second outlets 32*a*. It is understood, however, that the ejecting direction of the refrigerant ejected from the second outlets 32*a* crosses the ejecting directions of the refrigerant ejected from the first outlets 31*a*, since the thick arrow lines A crosses the second outlets 32*a* in FIG. 2.

The refrigerant passing through the second refrigerant passages 32 cools the rotor core 22 and the temperature rises slightly. The rotor 20 is rotating. The refrigerant ejected from the second outlets 32*a* collides with the refrigerant ejected from the first outlets 31*a* and splashes toward the coil ends 12*a* by centrifugal force. The coil ends 12*a* are cooled mainly by the refrigerant ejected from the first outlets 31*a*, but the refrigerant ejected from the second outlets 32*a* also contributes to cooling the coil ends 12*a*.

The refrigerant also is ejected from the second outlets 32*b* provided on the distal end surface 22*b* side. The rotor 20 is rotating. The refrigerant ejected from the second outlets 32*b* is bent by centrifugal force toward the coil ends 12*b*. The thick arrow lines C in FIG. 1 represent the direction of the refrigerant ejected from the second outlets 32*b*. The refrigerant ejected from the second outlets 32*b* cools the coil ends 12*b*.

The rotor core 22 has the plurality of second outlets 32*a* (the plurality of second outlets 32*b*), and the plurality of second outlets 32*a* (the plurality of second outlets 32*b*) is arranged along the circumferential direction of the rotor core 22 and equally spaced from each other.

Figure 3:
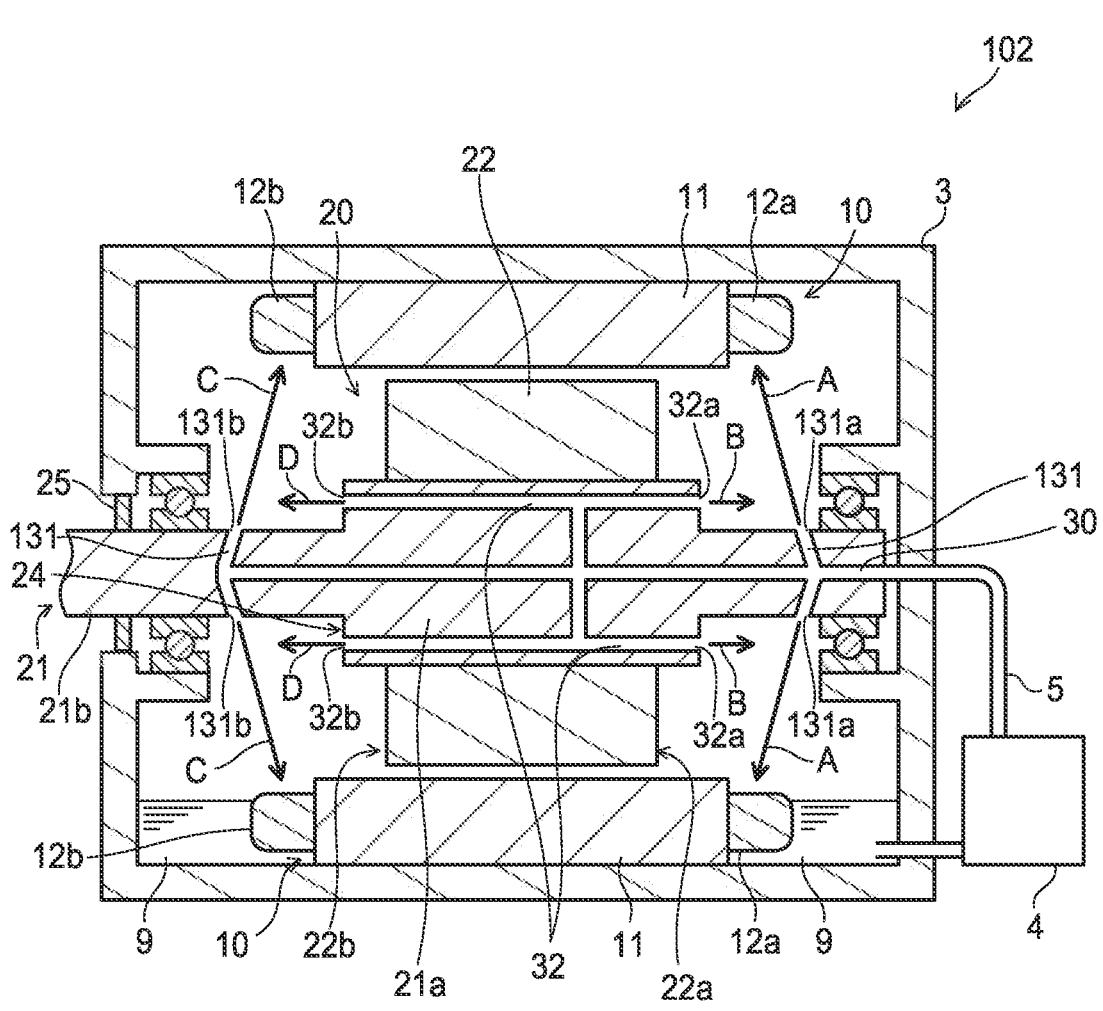
FIG. 3 illustrates a cross-sectional view of a modification of the motor of the first embodiment.
Figure 3:
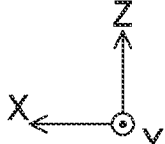

(Variant) FIG. 3 shows a cross-sectional view of a variant of the motor 2 (motor 102). In the motor 102, first refrigerant passages 131 are provided on both sides of the rotor core 22 in the shaft axial direction. Furthermore, angles of the first refrigerant passages 131 are different from those of the motor 2 of the first embodiment. In the motor 2 of the first embodiment, the longitudinal direction of the first refrigerant passages 31 is orthogonal to the shaft axis direction. In the motor 102, the longitudinal directions of the first refrigerant passages 131 are not orthogonal to the shaft axis direction. However, the longitudinal directions of the first refrigerant passages 131 extend toward the coil ends 12*a*. The first outlets 131*a* are also directed toward the coil ends 12*a*. Ejecting directions of the refrigerant (thick arrow lines A) ejected from the first outlets 131*a* are directed to the coil ends 12*a*. In other words, the ejecting direction at the first outlets 131*a* extend toward the coil ends 12*a*. The ejecting direction of the refrigerant ejected from the second outlets 32*a* (thick arrow lines B) crosses the ejecting directions of the refrigerant ejected from the first outlets 131*a* (thick arrow lines A). The motor 102 provides the same effect as the motor 2.

On the other side of the rotor core 22 as well, the longitudinal directions of the first refrigerant passages 131 extend toward the coil ends 12*b*. The first outlets 131*b* are also directed towards the coil ends 12*b*. Ejecting directions of the refrigerant ejected from the first outlets 131*b* (thick arrow lines C) are directed toward the coil ends 12*b*. In other words, the ejecting directions of the refrigerant at the first outlets 131*b* (thick arrow lines C) extend toward the coil ends 12*b*. The ejecting direction of the refrigerant ejected from the second outlets 32*b* (thick arrow lines D) crosses the ejecting directions of the refrigerant ejected from the first outlets 131*b* (thick arrow lines C). The refrigerant ejected from the second outlets 32*b* collides with the refrigerant ejected from the first outlets 131*b* and splashes toward the coil ends 12*b*. The coil ends 12*b* are cooled by the refrigerant ejected from the first outlets 131*b* and the refrigerant ejected from the second outlets 32*b*. In the motor 102 of the variant, the coil ends 12*a* and 12*b* at both ends of the stator 10 are effectively cooled.

Second Embodiment

Figure 4:
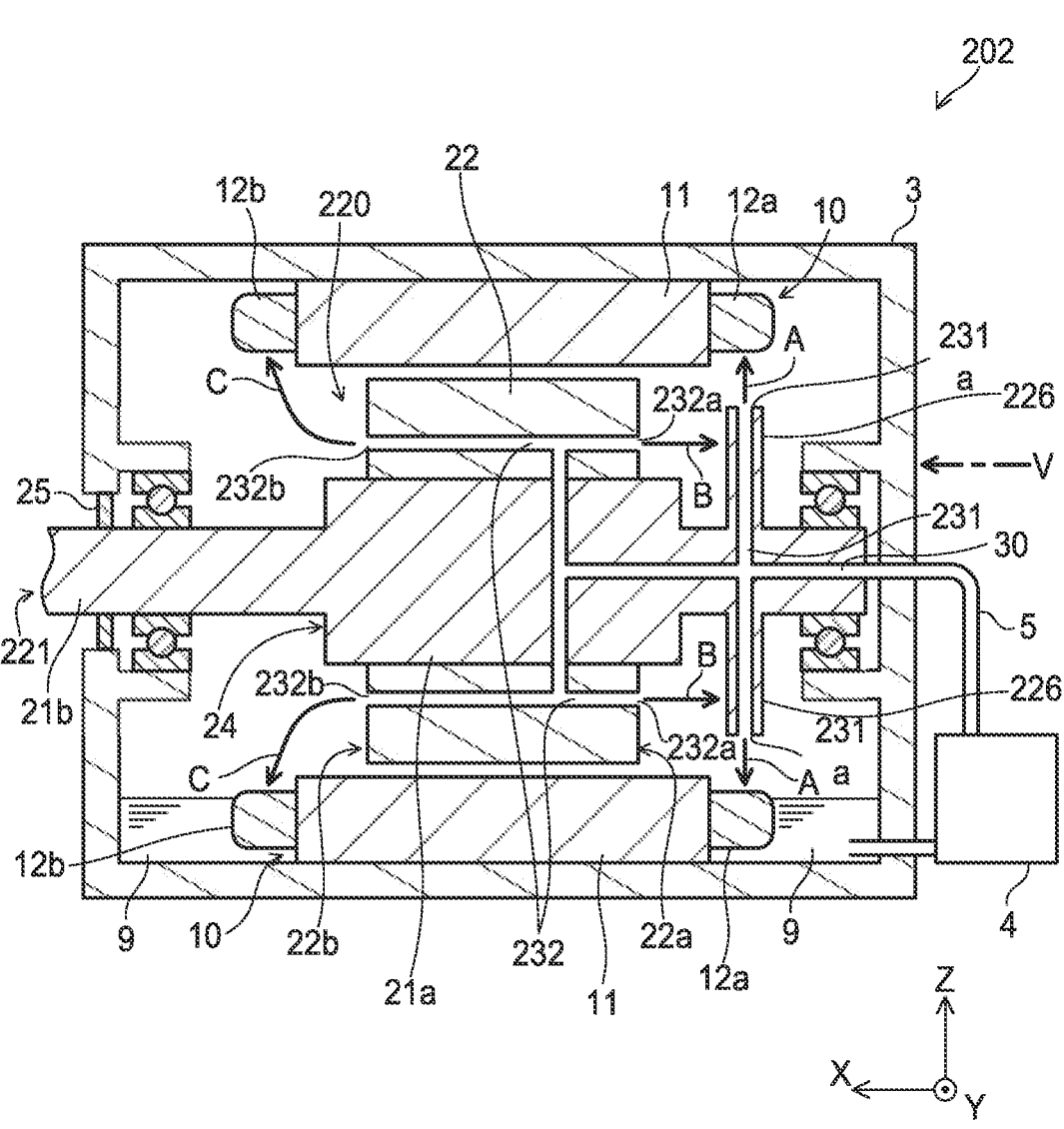
FIG. 4 illustrates a cross-sectional view of a motor of a second embodiment.
Figure 5:
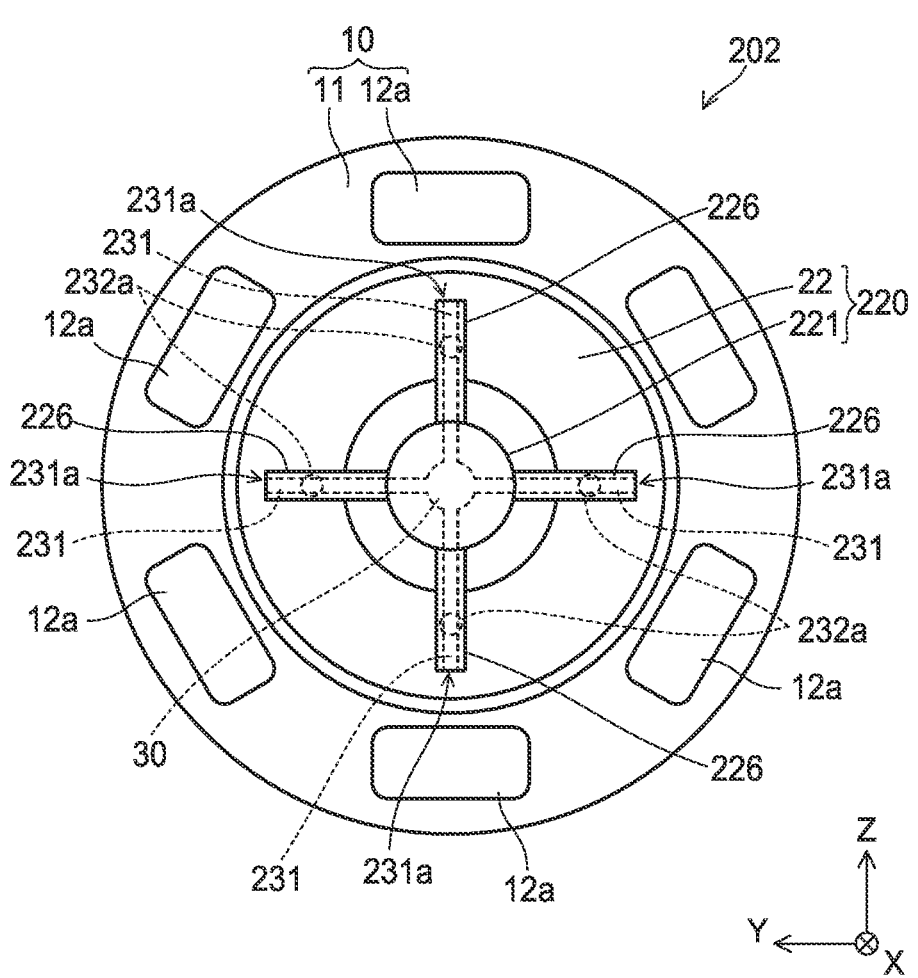
FIG. 5 illustrates the motor of FIG. 4 viewed along a one-dot-chain arrow V.

Referring to FIGS. 4 and 5, a motor 202 of a second embodiment is described. FIG. 4 is a cross-sectional view of the motor 202, and FIG. 5 illustrates the motor 202 viewed from the direction of a one-dot-chain arrow V in FIG. 4. However, in FIG. 5 as well, only a stator 10 and a rotor 220 of the motor 202 are illustrated, and illustration of the other parts is omitted.

The motor 202 includes the stator 10 and the rotor 220. The rotor 220 includes a shaft 221 and a rotor core 22.

In the motor 202, a plurality of protrusions 226 extends from a side surface of the shaft 221 toward coil ends 12*a*. A common refrigerant passage 30 extends along the centerline of the shaft 221. First refrigerant passages 231 extend from the common refrigerant passage 30 in a radial direction of the shaft 221. The first refrigerant passages 231 further extend into the insides of the protrusions 226. Outlets (first outlets 231*a*) of the first refrigerant passages 231 are open at the tops of the protrusions 226.

As shown in FIG. 5, the plurality of first refrigerant passages 231 extends radially from the center of the shaft 221. Each of the first refrigerant passages 231 is open at the top of a corresponding one of the protrusions 226. The openings of the first refrigerant passages 231 are referred to as first outlets 231*a*. The first refrigerant passages 231 extend toward the coil ends 12*a*, and the first outlets 231*a* are open toward the coil ends 12*a*. The ejecting directions at the first outlets 231*a* are directed toward the coil ends 12*a*. In other words, the ejecting directions at the first outlets 231*a* extend toward the coil ends 12*a*.

In the motor 202, similar to the motor 2 of the first embodiment, the refrigerant that has passed through first refrigerant passages 231 is ejected from the first outlets 231*a* toward the coil ends 12*a*. The thick arrow lines A in FIG. 4 show the ejecting directions of the refrigerant ejected from the first outlets 231*a*. The first refrigerant passages 231 do not extend inside the rotor core 22, thus remain cold. The coil ends 12*a* are cooled by the cold refrigerant that has not passed through the rotor core 22. Furthermore, the first outlets 231*a* are closer to the coil ends 12*a* as compared to the case of the first embodiment. The first outlets 231*a* being located close to the coil ends 12*a* also contributes to effectively cooling the coil ends 12*a*.

Second refrigerant passages 232 extend inside the rotor core 22. The rotor core 22 is cooled by the refrigerant flowing through the second refrigerant passages 232. The second refrigerant passages 232 extend inside the rotor core 22 and the outside of the shaft 221. The second refrigerant passages 232 are open at the proximal end surface 22*a* and the distal end surface 22*b* of the rotor core 22 (second outlets 232*a*, 232*b*). Thick arrow lines B show the ejecting direction of the refrigerant ejected from the second outlets 232*a* arranged at the proximal end surface 22a. The ejecting direction of the refrigerant ejected from the second outlets 232a (thick arrow lines B) crosses the protrusions 226. Although the ejecting direction is not illustrated in FIG. 5, it is understood that, since the protrusions 226 and the second outlets 232a overlap when viewed along the shaft axial direction, the ejecting direction of the refrigerant ejected from the second outlets 232a overlaps the protrusions 226.

The refrigerant passing through the second refrigerant passages 232 cool the rotor core 22 and the temperature rises slightly. The rotor 220 rotates. The refrigerant ejected from the second outlets 232a collides with the protrusions 226 and splashes toward the coil ends 12a by centrifugal force. The coil ends 12a are cooled mainly by the refrigerant ejected from the first outlets 231a, but the refrigerant ejected from the second outlets 232a also contributes to cooling the coil ends 12a. In particular, the protrusions 226 serve as guides to direct the flow of the refrigerant ejected from the second outlets 232a toward the coil ends 12a.

The refrigerant is also ejected from the second outlets 232b arranged at the distal end surface 22b. The rotor 220 is rotating. The refrigerant ejected from the second outlets 232b is bent toward the coil ends 12b by centrifugal force. Thick arrow lines C in FIG. 4 show the directions of the refrigerant ejected from the second outlets 232b. The refrigerant ejected from the second outlets 232b cools the coil ends 12b.

The rotor core 22 includes the plurality of second outlets 232a (the plurality of second outlets 232b), and the plurality of second outlets 232a (the plurality of second outlets 232b) is arranged along the circumferential direction of the rotor core 22 and equally spaced from each other.

The first refrigerant passages and the protrusions may also be provided on the distal end surface 22b side. Outlets of the first refrigerant passages (first outlets) are provided also at the distal ends of the protrusions on the distal end surface 22b side. The ejecting direction of the refrigerant ejected from the second outlets 232b also crosses the protrusions on the distal end surface 22b side.

Third Embodiment

Figure 6:
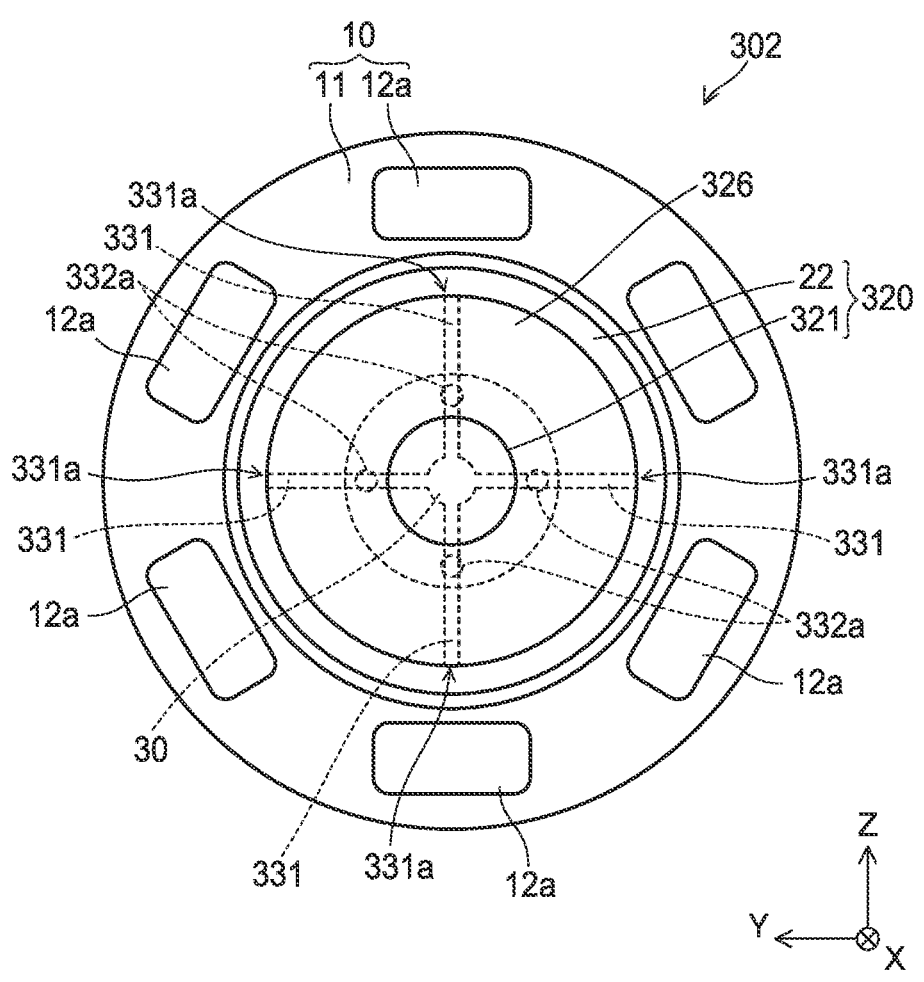
FIG. 6 illustrates a motor of a third embodiment viewed along a one-dot-chain arrow V of FIG. 4.

Referring to FIG. 6, a motor 302 of a third embodiment is described. The cross-sectional view of the motor 302 is identical with FIG. 4, however, the protrusions 226 are replaced by a disk plate 326. FIG. 6 illustrates the motor 302 viewed along the direction of the one-dot-chain arrow V in FIG. 4. In FIG. 6 as well, only a stator 10 and a rotor 320 of the motor 302 are illustrated, and illustration of the other parts is omitted.

The motor 302 has the stator 10 and the rotor 320. The rotor 320 includes a shaft 321 and a rotor core 22.

In the motor 302, the disk plate 326 is coaxially attached to the shaft 321. The disk plate 326 is arranged at the same position as coil ends 12a in the shaft axial direction. A common refrigerant passage 30 extends along the centerline of the shaft 321. First refrigerant passages 331 extend from the common refrigerant passage 30 in the radial direction of the shaft 321. The first refrigerant passages 331 further extend to the inside of the disk plate 326. Outlets (first outlets 331a) of the first refrigerant passages 331 are open at the side (peripheral) surface of the disk plate 326. Ejecting directions of the refrigerant ejected from the first outlets 331a are directed toward the first outlets 331a. The ejecting directions of the refrigerant ejected from the first outlets 331a extend toward the coil ends 12a.

As shown in FIG. 6, the plurality of first refrigerant passages 331 extends radially from the center of the shaft 321. Each of the first refrigerant passages 331 is open at the side surface of the disk plate 326. The openings of the first refrigerant passages 331 are referred to as first outlets 331a. The first refrigerant passages 331 extend toward the coil ends 12a, and the first outlets 331a are open toward the coil ends 12a.

As with the motor 2 of the first embodiment, in the motor 302, the refrigerant that has passed through the first refrigerant passages 331 is ejected from the first outlets 331a toward the coil ends 12a. The refrigerant passages 331 do not extend inside the rotor core 22, thus are cold. The coil ends 12a are cooled by the cold refrigerant that has not passed through the rotor core 22. Furthermore, the first outlets 331a are closer to the coil ends 12a as compared to the case of the first embodiment. The first outlets 331a being located close to the coil ends 12a also contributes to effectively cooling the coil ends 12a.

Second refrigerant passages of the motor 302 are the same as the second refrigerant passages 232 of the motor 202. The second refrigerant passages 232 extend inside the inside of the rotor core 22. The rotor core 22 is cooled by the refrigerant passing through the second refrigerant passages 232. The second refrigerant passages 232 extend inside the inside of the rotor core 22 and the outside of the shaft 221.

In the motor 302, as well as the motor 202, the second refrigerant passages 232 are open at the proximal end surface 22a and the distal end surface 22b of the rotor core 22 (FIG. 4). Refrigerant outlets at the proximal end surface 22a correspond to second outlets 332a. The second refrigerant passages extend within the rotor core 22 in the shaft axial direction and are open at the end surface of the rotor core 22 (the second outlets 332a). Although the ejecting direction of the refrigerant is not illustrated in FIG. 6, it is understood that the ejecting direction of the refrigerant ejected from the second outlets 332a overlap the disk plate 326 because the disk plate 326 and the second outlets 332a overlap when viewed in the shaft axial direction.

The refrigerant passing through the second refrigerant passages 232 cools the rotor core 22 and the temperature rises slightly. The rotor 320 rotates. The refrigerant ejected from the second outlets 332a collides with the disk plate 326 and splashes toward the coil ends 12a by centrifugal force. The coil ends 12a are cooled mainly by the refrigerant ejected from the first outlets 331a, but the refrigerant ejected from the second outlets 332a also contributes to cooling the coil ends 12a. In particular, the disk plate 326 serves as a guide to direct the flow of the refrigerant ejected from the second outlets 332a toward the coil ends 12a.

Although not illustrated, the motor 302 also includes second outlets (other refrigerant outlets of the second refrigerant passages) at the distal end surface of the rotor core 22. The refrigerant ejected from the second outlets at the distal end surface cools the coil ends 12b.

The first refrigerant passages and the disk plate may also be provided on the distal end surface side. On the distal end surface side as well, outlets of the first refrigerant passages (first outlets) are provided on the side surface of the disk plate. On the distal end surface side as well, the ejecting direction of the refrigerant ejected from the second outlets crosses the disk plate.

As explained above, the motor 2 (102, 202, 302) of the embodiments can efficiently cool each of the coil end and the rotor core. The protrusions 226 and the disk plate 326 provided on the shaft guide the refrigerant ejected from the second outlets 232*a* (332*a*) to the coil ends 12*a*. The coil ends can be cooled further efficiently by the protrusions 226 and the disk plate 326.

Notes on the technique described in the embodiments are described. The second refrigerant passages extend inside the inside of the rotor core. The second refrigerant passages may extend inside the shaft or through the outside of the shaft.

The phrase "refrigerant outlets of the first refrigerant passages (first outlets) are open toward the coil ends" means that each of the first outlets is directed toward any of the coil ends 12*a* while the shaft is rotating.

The second refrigerant passages extend inside the rotor core. In other words, the second refrigerant passages are at least partially arranged between one end surface and the other end surface of the rotor core in the shaft axial direction. In yet other words, the second refrigerant passages are at least partially arranged in an area in which the rotor core and the shaft overlap in the shaft axial direction.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. Further, the purpose of the examples illustrated by the present disclosure or drawings is to satisfy multiple objectives simultaneously, and satisfying any one of those objectives gives technical utility to the present disclosure.

What is claimed is:

1. An electric motor comprising:

a shaft rotatably supported by a housing;

a rotor core fixed to the shaft;

a stator arranged outside the rotor core in a radial direction of the rotor core, the stator including coil ends at both ends;

a first refrigerant passage provided in the shaft and arranged outside the rotor core in an axial direction of the shaft; and a second refrigerant passage extending inside the rotor core, wherein a first outlet of the first refrigerant passage is provided on the shaft, an ejecting direction of the refrigerant at the first outlet is directed towards one of the coil ends, a second outlet of the second refrigerant passage is provided on the shaft, and an ejecting direction of the refrigerant ejected from the second outlet crosses the ejecting direction of the refrigerant ejected from the first outlet.

2. The electric motor according to claim 1, wherein the second refrigerant passage is provided inside the shaft.

* * * * *